United States Patent
De Witt et al.

[15] 3,687,267
[45] Aug. 29, 1972

[54] CONVEYOR LOADING AND COUNTING SYSTEM

[72] Inventors: David A. De Witt, 9 Wempel Building, Netherlands Village, Schenectady, N.Y. 12308; Ralph W. De Witt, 68 Spring Ave., Latham, N.Y. 12110

[22] Filed: Nov. 10, 1970

[21] Appl. No.: 88,422

Related U.S. Application Data

[62] Division of Ser. No. 701,979, Jan. 31, 1968, Pat. No. 3,593,008.

[52] U.S. Cl. ..................198/40, 198/26, 198/37
[51] Int. Cl. ..................B65g 43/08, B65g 47/10
[58] Field of Search......198/21, 37, 40, 26; 214/16 B

[56]           References Cited

UNITED STATES PATENTS

| | | | |
|---|---|---|---|
| 1,482,197 | 1/1924 | Kimball | 198/37 X |
| 583,111 | 5/1897 | Friedman | 198/40 X |
| 1,970,574 | 8/1934 | Pelosi | 198/37 |
| 3,063,544 | 11/1962 | Yen | 198/37 |

• FOREIGN PATENTS OR APPLICATIONS

| | | | |
|---|---|---|---|
| 1,260,830 | 4/1961 | France | 198/40 |

*Primary Examiner*—Edward A. Sroka
*Attorney*—Charles W. Helzer

[57]            ABSTRACT

A conveyor loading and counting system is described for deriving a count and controlling operation of a conveyor for transporting articles between a loading and unloading area. The system includes loading and unloading area count registering means coupled to and controlling loading and unloading area counting and read-out means, respectively. The loading area count registering means includes a loading area count registering trigger mounted on a conveyor mechanism for moving completed articles from the loading area to an unloading area with the trigger means being actuated by a completed article passing over the conveyor mechanism for registering one unit count for each completed article transported by the conveyor mechanism out of the loading area into the unloading area. The conveyor mechanism includes a power driven portion that normally in its inactive condition engages a completed article subsequent to the completed article being loaded upon the conveyor mechanism and wherein the count registering trigger of the loading area counter, in addition to registering a unit count for each completed article loaded upon the conveyor mechanism, also actuates the power driven portion of the conveyor to cause the conveyor to move the article off the trigger a sufficient distance to assure return of the trigger to its normally inactive position (thereby recording one count) while simultaneously loading the power driven portion of the conveyor with one completed article. The conveyor mechanism preferably includes a plurality of different located count assuring stops for accommodating different types of articles produced by the manufacturing facility and being loaded on the conveyor. The system also further includes a plurality of different characteristic article counters at both the loading areas for deriving a count of each different type of article completed in the manufacturing facility and a type of article selector for selectively activating a desired one of the differently located count assuring stops and different characteristic article counters. The system also further includes at least one over-delivery sensing and inactivating control means for sensing a build up of unloaded articles being delivered to the discharge-unloading end of the conveyor mechanism above a predetermined number, and for inactivating the power driven portion of the conveyor mechanism in response thereto. Further, manually operable control means also are provided for inactivating the power driven portion of the conveyor at the option of an operator-unloader working at the discharge-unloading end of the conveyor.

16 Claims, 3 Drawing Figures

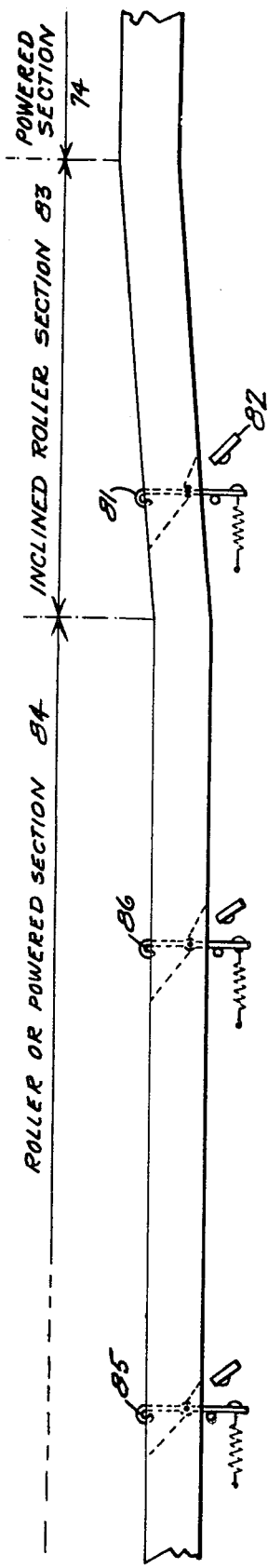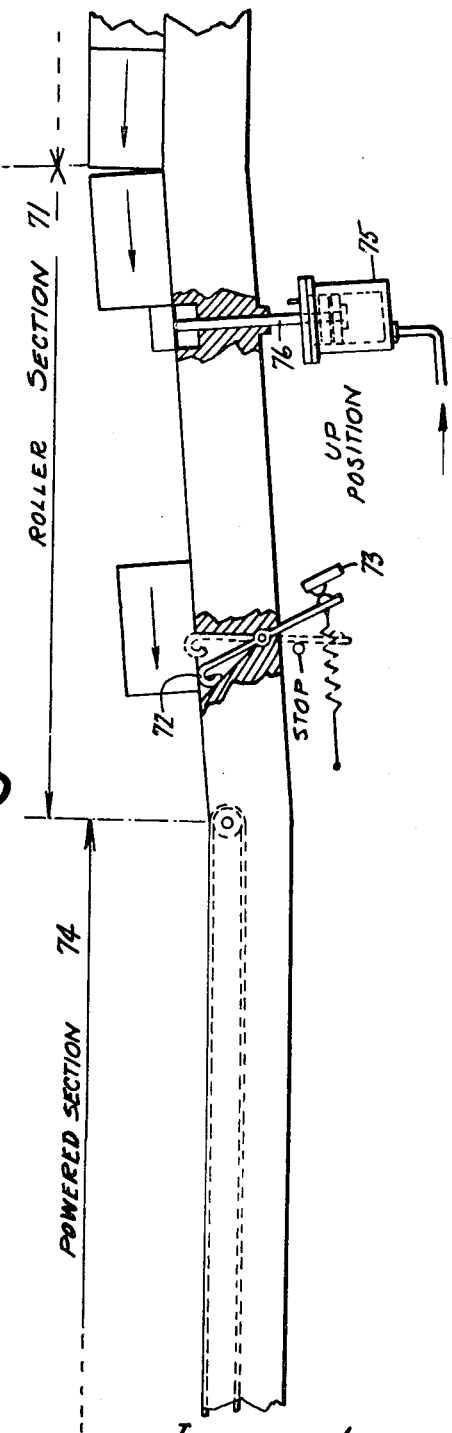
Fig. 3.
Fig. 2.
Inventors
David A. DeWitt
Ralph W. DeWitt
by Charles W. Helzer
Their Attorney

3,687,267

CONVEYOR LOADING AND COUNTING SYSTEM

This is a divisional application of Ser. No. 701,979 filed Jan. 31, 1968, now U.S. Pat. No. 3,593,008 issued July 13, 1971.

BACKGROUND OF INVENTION

1. Field of Invention

This invention relates to an automated conveyor loading and counting system for use in an article per unit of time worked recording system.

More particularly, the invention relates to an automatic conveyor loading and counting system for use in obtaining a central, continuously up-dated, running account of all people-hours worked in a manufacturing facility in a given interval of time, the number of people working, the number of articles produced and transported through a packing area over a conveyor system to a warehouse area for storage and distribution whereby an accurate and readily obtained up-to-date figure for the number of articles produced per worked hour and/or the number of articles produced, handled and stored, is instantaneously available for accounting and inventory purposes at any time during the work day as well as at the end of the work day.

2. Description of Prior Art Situation

Heretofore, manufacturing facilities have had no convenient and reliable means for rapidly assimilating important data relating to the operation of the facility and its efficiency at any given instant during the work day. This is particularly true of larger manufacturing facilities having manufacturing operations carried out at a number of unit assembly line areas or work stations in different locations. It has generally been the practice to wait to the end of each day's production to accumulate such data manually by a clerk, etc. However, in many operations which are highly competitive and border on being marginal in return, to wait for a full days' results in order to determine whether or not a given operation is running efficiently, may very well turn out to be a catastrophic. What is needed in this kind of operation, is a system which makes available at a central location continuously up-dated, accurate data bearing on the efficiency of the manufacturing facility on a substantially instantaneous demand basis at any time during or after a work day. To satisfy this need, the present applicant's U.S. Pat. No. 3,593,008 Issued July 13, 1971 -entitled: "Article/Time Recording System" (of which the present case is a divisional application) describes a semi-automated system for accurately and readily obtaining a continuously up-dated indication of the number of articles produced per worked hour and/or the number of articles produced, handled and stored at any point in time during or after work, and such indication is instantaneously available for accounting and/or inventory purposes at any time during or after the work day. For a more detailed description of the Article/Time Recording System reference is made to the above identified U.S. Pat. No. 3,593,008, the disclosure of which is hereby incorporated by reference in its entirety.

The Article/Time Recording System disclosed in U.S. Pat. No. 3,593,008 possesses the following characteristics:

1. The system keeps an accurate count of every employee punching into or out of work in the facility on a time clock which may be of conventional construction if desired.

2. The system keeps an accurate count of everyone employed on any work station, assembly line, packing area or any other type of operation utilized by the firm.

3. The system makes available at any time the total amount of accumulated worker time for those employees on any desired operation. This information is in direct read-out form, accurate to any desired decimal amount of the total accumulation of worked time, on any operation, by any number of employees, and is available at any desired time of read-out. The important feature to note is that the read-out is accumulated constantly and is instantaneously available at any time during the work day.

4. The system also records all of the items or parts produced, in any unit amount desired, that are or are not a direct result of the previously mentioned operations. In cases where the items produced are a direct result of those operations, it can be readily appreciated that a figure of units per worked hours is available by simply dividing the total number of units produced by the total number of worked hours used in producing those units. Here again, the figure is available either manually through mental division computation, or electrically through a direct acting computation device of an electro-mechanical or electronic nature. This figure also is available on an instantaneous basis at any desired read-out time during the work day.

5. The system can completely record all of the items passing over a conveyor system for transporting the completed articles from an assembly area to an unloading or storage area. This can be done item by item again reading out in any units desired. Another important feature is that the items to be transported by the conveyor can be placed on the conveyor at random without any special coded markings necessary on the item other than to indicate that an item has been counted, and the system can be set so as to not only count the randomly placed items unit by unit, but also sort them by item into a separate count of each type of item being transported.

6. The system supplies information on how many people are working at any instant since they have been recorded by the time clock. It will also provide information as to the total time accumulated up to a given point of read-out to any decimal amount desired, and the total number of people and amount of time worked by the same people on any given operation. This supplies an instantaneous check of time and people to be paid against time worked or people working respectively on the several operations being conducted in the facility.

7. The system will also supply information as to the unit pieces per worked hour or per person on an instantaneous demand basis. These figures are extremely important in any firm employing standard cost control measures. It will aid in obtaining accurate and adequate standards for a given manufacturing facility using standard units per worked unit of time. This helps in controlling production and evaluating the advantages or disadvantages of different production techniques on and "on the spot" instantaneous basis after introducing new procedures or changing old techniques.

8. The system also aid in recording all of the units of an item produced and supplies a triple check on this figure which is important in obtaining accurate inventory control.

In order to provide the information and characteristics set forth in items 5 and 8 above in connection with the Article/Time Recording System, the present invention was devised. However, while the present Conveyor Loading and Counting System is intended primarily for use in the Article/Time Recording System, it is by no means restricted to such use and may find application to a wide variety of uses where it is desired to obtain a count of articles being transported automatically along with automatic actuation and control of a conveyor mechanism.

SUMMARY OF INVENTION

It is therefore a primary object of the present invention to provide a new and improved automatic conveyor loading and counting mechanism for automatically keeping count of articles loaded on the mechanism as well as controlling operation of the conveyor to draw off the articles and transport them to an unloading area.

Another object of the invention is to provide a conveyor loading and counting mechanism of the above type which also automatically keeps count of all articles transported by and unloaded from the mechanism.

A still further object is to provide such a mechanism which is capable of handling a number of different types of articles and includes a plurality of safety control features for avoiding improper handling of the mechanism.

In practicing the invention, a conveyor loading and counting system is provided which includes loading area counting and read-out means for deriving a count of the completed articles being processed through a loading area supplied from a predetermined number of packing areas in the facility for deriving a count of the completed articles being processed through the loading area. Loading area count registering means are coupled to and control the loading area counting and read-out means and preferably include a loading area count registering trigger mounted on a conveyor mechanism for moving completed articles out of the loading area. The count registering trigger is actuated by a completed article passing over the conveyor mechanism for registering one unit count in the loading area counting read-out means for each completed article transported by the conveyor mechanism out of the loading area. The conveyor mechanism preferably includes a power driven portion than normally in its inactive condition engages a completed article subsequent to the completed article being loaded upon the conveyor mechanism. The mechanism is arranged such that the count registering trigger in addition to registering a unit count for each completed article loaded upon the conveyor mechanism, also actuates the power driven portion of the conveyor to cause the conveyor to withdraw the completed article off the count registering trigger and onto the power driven portion a sufficient distance to assure return of the trigger to its normally inactive position while simultaneously recording one unit count and loading the power driven portion of the conveyor with one completed article. It is preferred that the loading area counting and read-out means also include a plurality of different characteristic article counters for deriving a count of each different type of article completed in the manufacturing facility and processed through the loading area. Type of article selector means are also provided with comprise a part of the loading area count registering means for selectively activating a desired one of the plurality of different characteristic article counters in accordance with the type of article being processed through the loading area. The conveyor loading and counting mechanism also has at its discharge unloading end at least one over-delivery sensing and inactivating control means for sensing a build-up of unloaded articles being delivered to the unloading end of the conveyor above a predetermined number and for inactivating the power driven portion of the conveyor in response to this build up. A manually operable control means is also provided for inactivating the power driven portion of the conveyor at the option of an operator-unloader working at the discharge-unloading end of the conveyor.

Unloading area counting and read-out means are also provided for deriving a count of the completed articles being transported to the unloading area from the manufacturing facility, and unloading area count registering means located in the unloading area are coupled to and control the unloading area counting and read-out means. The unloading area count registering means preferably comprises an unloading article sensing trigger mounted on the discharge-unloading end of the conveyor mechanism for registering on unit count for each article transported over the conveyor from the loading area into the unloading area. If desired, the unloading area may comprise a warehouse, a vehicle for transporting the funished articles away from the manufacturing facility, etc.

BRIEF DESCRIPTION OF DRAWINGS

Other objects, features and many of the attendant advantages of this invention will be appreciated more readily as the same becomes better understood by reference to the following detailed description when considered in connection with the accompanying drawings, wherein like parts in each of the several figures are identified by the same reference character, and wherein:

FIG. 2 is a sectional view of an unpowered, gravity operated roller loading section for a conveyor loading and system according to the invention and intended for use in the loading area of a manufacturing facility, and shows the construction of a count recording and power conveyor actuating trigger device used on the loading section/ and FIG. 3 is a sectional view of a discharge-unloading end of the conveyor loading and counting system of FIG. 2 and illustrates a count trigger arrangement and load limiting power inactivating switch arrangement for controlling operation of the conveyor in the unloading area and simultaneously obtaining a count of all articles processed through the unloading area.

DETAILED DESCRIPTION OF PREFERRED EMBODIMENT

Figure 1:
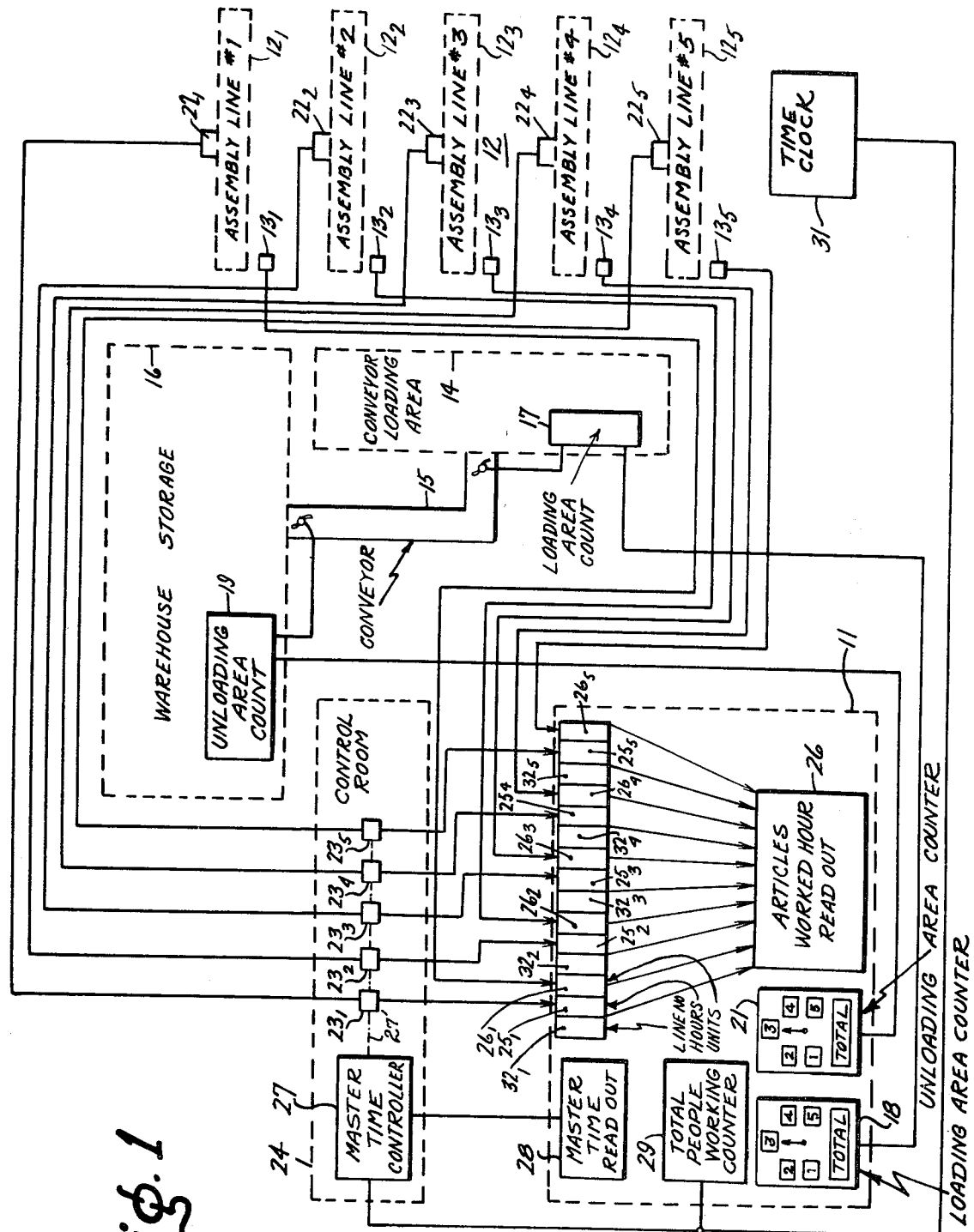
FIG. 1 is an overall functional block diagram of an article/time/persons working recording system for a manufacturing facility and illustrates the preferred manner of use of the conveyor loading and counting system comprising the invention.

Overall Article/Time Recording System - People - Time Counting and Read Out

FIG. 1 of the drawings illustrates the overall article/time/people recording system comprising the invention as applied to a manufacturing facility having some five assembly lines where each assembly line produces an individual type of product that is then packed into suitable containers at the end of the line and transferred out to a warehouse storage area to await distribution. It is to be expressly understood that the system is in no way restricted to the particular manufacturing facility herein described, but may be applied to any manufacturing facility wherein it is desired to utilize the system. For example, should it be desired the system could be used in connection with only a single assembly line supplying a single warehouse storage area. However, it is believed that the multiple assembly line manufacturing facility poses the more general problem, and hence, it has been chosen as the background with which to describe the present invention.

The article/time recording system installation illustrated in FIG. 1 utilizes a read-out information station shown at 11 where the several counters and meters used in monitoring the people-hours worked, and the number of articles produced by all of the time recorded people working on a plurality of assembly lines shown at $12_1$, $12_2$, $12_3$, etc, are located. The articles produced on each of the assembly lines 12 are packed in a suitable packing area and simultaneously counted by packing area counters shown at $13_1$, $13_2$, $13_3$, etc. The packed articles are then supplied to a conveyor loading area shown at 14 where they are loaded onto a conveyor shown at 15 for transportation to an unloading or warehouse area shown at 16. The conveyor loading area 14 also includes a loading area count registering device 17 which supplies a count of the articles passing through the conveyor loading area to a loading area counter 18 located in the read-out information station. Similarly, an unloading area count registering device 19 supplies a count of the articles coming into the unloading area or warehouse storage area 16 to an unloading area counter 21 likewise located in the read-out information station 11.

In the producing the completed articles packed at the end of each assembly line 12, the scheduled production (as determined by a line supervisor) requires that the assembly line have a certain number of workers or people applied to the work for a certain amount of time. In order to obtain an accurate record of the required amount of worker-time or people-time needed to produce the articles, a line people-hours count registering device shown at $22_1$, $22_2$, $22_3$, etc is provided for each assembly line and is under the control of the line supervisor. The output for each of the line people-hours count registering devices 22, which is electrical in nature, is supplied to a plurality of line time controllers and people-time count signal digitizing means $23_1$, $23_2$, $23_3$, etc located in a control room 24. The outputs from the line time controllers and digitizers 23 are supplied to respective central people hours worked counting and read-out means comprised by a plurality of counters $25_1$, $25_2$, etc located in the read-out information station 11. The counters 25 are conventional, commercially available direct current counters of the type manufactured and sold by a number of United States manufacturers. For example, the 24 volt direct current counter type number - 19835—006 manufactured and sold by the Veeder Root manufacturing company is satisfactory for this component. Counters of this type generally comprise decade counters which provide a visual indication of the count accumulated in the counters.

The electrical output signals derived from all the line people-hours count signal digitizing devices $23_1$, $23_2$, $23_3$, etc also are supplied to an hours-worked per article computing and read-out machine shown at 26 and located in the read-out information station 11, in parallel with the counters 25. Alternatively, for less elaborate installations, it is possible to omit the articles per worked hour computing and read-out machine 26 and perform the necessary division mentally from the reading of the counters 25 and the reading of a plurality of articles completed counters $26_1$, $26_2$, $26_3$, etc to which are supplied the output count signals driven from all of the packing area count registering devices 13. The articles completed counters 26 may be similar in construction to the counters 25.

The construction and operation of the line time controllers, digitizers 23, packing area count registering devices 13, and line people-hours count registering devices 22 are described more fully in the above referenced U.S. Pat. No. 3,593,008. The construction and operation of the loading area count registering device 17, the construction of the conveyor 15, the unloading area count registering device 19, the loading area counter 18 and the unloading area counter 21 will be described more fully hereinafter in a more detailed manner. The articles per worked hour read-out machine 26 may comprise an on line, general purpose digital computer for use in inventory control or the like which generally can be found in more expensive and elaborate manufacturing installations.

In addition to the above several subsystems, the article/time recording system further includes a master time controller 27 located in control room 24 and a master time read-out counter 28 located in the read-out information station 11. The master time controller 27 is similar in construction and operation to the line time controllers and digitizers 23. Similarly, the master time read-out counter 28 is similar to the counters 25 and 26 with the exception that it is capable of accumulating a much greater count then are the counters 25 and 26. Also included in the read-out information station 11 is a total people working counter 29 which preferably is a reversible counter of conventional construction. The total people working counter 29 and the master time controller 27 are connected to and controlled by the output from a time clock 31 that is located in an area where people going to and coming from the assembly lines 12 are required to punch-in and punch-out when going to and from their work stations at the beginning and end of each work day, and during the noon lunch period.

The time clock 31 may comprise a conventional, commercially available time clock such as the Simplex time recorder-model number 65 JD 8 manufactured and sold by the Simplex Time Recording Company.

However, it is preferred that the time clock 31 comprise a specially designed time clock which is described more fully in U.S. Pat. No. 3,596,277 entitled "Control Circuit For Time Clock and Master Counter" issued July 27, 1971 - David A. and Ralph W. DeWitt, Inventors. The specially designed time clock and control circuit described in our above-identified copending U.S. application includes not only a means for punching-in and punching-out workers at particular authorized times such as the morning starting time, the noon lunch break, and the normal evening quitting time, so as to add to or subtract from the total number of people shown as being punched in and working in the facility at any given time; but it also includes ancillary by-pass punch-in and punch-out means which are key operated for punching-in and punching-out workers at other than the particular authorized times at the discretion of a supervisor. The time clock circuit disclosed serves to develop a number of electric output signal pulses which correspond to the punching-in or punching-out of workers coming to and leaving the manufacturing facility. These electric signal pulses are supplied to the total people working counter 29 which is a revesible counter and provides an instantly available count of all time recorded people working in the facility at any given time. These electric signal pulses also are supplied to the master time controller 27 for controlling the master time read-out count accumulated by counter 28.

In operation, the article/time recording system shown in FIG. 1 functions in the following manner. At a predetermined time before actual work is begun a warning signal is triggered by the time clock 31. At this time, a special device wired into the time clock actuates and places the clock in a "punch-in" mode of operation. During this period, the workers to be assigned to the assembly lines may punch their time cards, and proceed to their various work assignments. At the exact time that work is to begin, a second signal is sounded which is again controlled by the time clock 31. At this time, the master time controller enables all of the line time controllers 23₁, 23₂, etc through a connection 27' that includes suitable relay actuated contacts in series with the power supply to the line time controllers, with the relay actuated contacts being actuated by the master time clock control circuit. Also, the special device in the time clock actuates the clock mechanism so as to put the clock in a "no-punch" mode. That is, after this time no further punching by the simple process of inserting a time card into the clock, is possible, and from this point on workers arriving to punch-in will be considered late for work. Since most manufacturing firms place their workers on the assembly lines before the work signal it is quite difficult, along with all the other tasks that a supervisor has to do during normal work operations, to place a late person on an assembly line immediately. Since the worker must then stand and wait, with this system the worker now waits without being punched-in and therefore he must wait on his "own" time and not the company's. Thereafter, when the supervisor has a place on an assembly line for the late worker, he can then by-pass the "no-punch" circuit with a key supplied to the supervisor for this purpose, allow the worker to punch his time card, and then place the worker at a particular place on an assembly line where he is to be assigned.

Each time a worker punches into the article/time recording system, whether it be during a regular "punch-in" period or with the "punch-in" by-pass key, the counter 29 in the read-out room 11 advances by one count. Thus, the counter 29 can supply at any time the total number of people working in the facility at any given time, and hence the people to be paid at this time. Concurrently with the actuation of the total working counter 29, a stepping switch on the master time controller 27 (to be described more fully hereinafter) is advanced by one count. At the time of the start work signal, all of the time of those people punched into the clock starts to record on the master time read-out 28. This provides the read-out of the total time of all the time recorded people working in the facility on the various assembly lines 12. As workers are allowed to punch-in by a supervisor through the use of his key operated "by-pass" of the no-punch mode of the time clock, these workers times likewise will start to be added to the total time being accumulated by the master time read-out counter 28.

At the noon lunch break normally occurring around 12 p.m., the time clock 31 automatically changes to a punch-out mode during which period workers can punch out automatically by inserting a time card into the clock in a normal manner and thereby allow the workers to punch-out for their noon luncheon break. After a short interval of time, it is preferable that the time clock again revert to a no-punch mode of operation until the end of the noon luncheon break, normally occurring around 12:30 p.m. At this time, the time clock 31 again automatically goes into a punch-in mode during which time workers can again punch-in their time card by merely inserting the time cards into the time clock. Thereafter, the time clock again reverts to its no-punch mode until the end of the work period when the punching out process is again repeated. Each time that a worker punches out, whether it is during the prescribed "punch-out" period at noon or at the end of the work day, or whether it is a key operated by-pass form of punch-out with the assistance of the supervisor, the reversible total people working counter 29 will count down by one count for each worker punching-out, and similarly, one worker will be subtracted from the total number of workers times being registered in the master time controller 27 so as to show on the master time read-out 28. For a more detailed description of the construction and operation of the time clock 31, and particularly the means for punching-in and punching-out workers at particular authorized times so as to add to or subtract from the total number of people working in the facility at any given time recorded on the total people working counter 29, as well as the ancillary, key operated, by-pass punch-in and punch-out means for punching-in and punching-out workers at other than the particular authorized times at the discretion of a supervisor, reference is made to our above-identified U.S. Pat. No. 3,596,277.

After punching-in at the time clock 31, a worker is placed on one of the five assembly lines 12, and at this time, a supervisor adds one count to his line people-hours count registering device 22₁, 22₂, etc which preferably also includes a read-out light located in the assembly line area to indicate to the supervisor the total number of people working on that particular assembly line. The line people-hours count registering device actually is a pair of electric switches with one switch representing a plus (+) and the other a minus (−) for adding to or subtracting from the number of workers indicated by the read-out light. Upon a worker being added, the plus (+) switch is pressed by the supervisor and will add one count to the number indicated by the read-out light in the assembly area, and simultaneously will add one count to the number being read-out by the line time controllers and digitizers 23 located in the control room 24. Similarly, if a worker is removed from the assembly line, the supervisor merely actuates the minus (−) switch so as to subtract one count from the number indicated on the assembly line read-out light, and simultaneously subtract one count from the people-time count of the line time controllers and digitizers 23. If it desired to change a worker from one assembly line to another assembly line, the minus (−) control on the assembly line that he is leaving is depressed, and the plus (+) control switch on the line that he is entering is actuated.

From the foregoing description, it will be appreciated that whenever a plus (+) or minus (−) switch in the line people-hours count registering devices 22, is actuated, two simultaneous events take place. The number recorded in the read-out light located in the assembly line area is changed by adding or subtracting one digit due to a stepping switch on the line time controllers and digitizers 23 located in the control room 24 being stepped up or stepped down, respectively. The stepping-up or down of the stepping switch also changes the people-hours count being recorded on the counters 25 located in the read-out information station 11. In addition, preferred installations will include read-out counters shown at 32, $32_2$, $33_3$, etc located in the read-out information station 11 for a purpose to be disclosed more fully hereinafter. Thus, if these counters are provided, a third event will occur upon the line people-hours count registering device 22 being actuated which results in changing the number indicated by the read-out counters 32 located in the information station. Whenever the stepping switch on one of the line time controllers and digitizers 23 is stepped up or down, that person's time on the line begins to be either added or stops being recorded, respectively to the total hours-worked time being recorded on the counters 25 located in the read-out information station 11. Hence, it will be appreciated that at any time when a person is added or subtracted from an assembly line, his time instantaneously begins to be added to the total on the line he is assigned to, and ceased to be recorded on the line at which he was previously working.

Completed Article Counting and Read-out

The next important feature provided by the conveyor loading and counting system of the invention is the exact tallying of all articles being produced on each assembly line 12. This tallying of the articles produced throughout the manufacturing facility, is accomplished in three places; namely in the packing area for each assembly line with the packing area count registering devices 13, in the loading area 14 with the loading area count registering device 17, and the unloading area or warehouse 16 with the unloading area count registering device 19. The construction and operation of each of the devices 13, 17, and 19 will be described more fully hereinafter; however, it is important to note that the article counts derived by these devices are supplied to counters in the read-out information room for producing a readily accesible, centrally located tally of all of the items produced and subsequently handled in the manufacturing facility.

The count recorded by the packing area count registering devices 13 is supplied to respective central articles completed counting and read-out counters $26_1$, $26_2$, $26_3$, etc located in the read-out information room 11. The loading area count derived by the loading area count registering device 17 is supplied to the loading area counter 18, and the unloading area count derived by the unloading area count registering device 19 is supplied to an unloading area counter 21 with both counters 18 and 21 being substantially identical and located side by side in the read-out information station 11. It should be noted at this point that the loading area counter 18 and the unloading area counter 21 located in the read-out information room may readily keep track of all the packed articles moving from the loading area into the unloading area by the conveyor 15. This also supplies a cross check against the counts obtained on the packing area counters 26 from all of the unit assembly line read-outs. This is achieved by designing counters 18 and 21 to include separate assembly line unit counters 1—5 for providing a count of each separate type of article produced by the respective assembly lines, as well as a total count of all articles passing through the loading and unloading areas.

In operation, the article tallying portion of the article/time recording system functions in the following manner. At the beginning of the work day, or at the beginning of some other similar period of work time, all of the unit meters are set at zero, and at the end of the period, all of the articles produced during the period are placed in the warehouse storage area. With these operating conditions satisfied, the sum total on each assembly line counter 26 should equal the total, for each item respectively, of the unit meters 1—5 on the panels of the loading area counter 18 and the unloading area counter 21. Also, the total of all of the assembly line read-outs 26 together should equal the totals shown on both the loading area counter 18 and the unloading area counter 21. Should it prove desirable, it is also possible to have pieces produced per hour meter for each assembly line which can be made visual to the workers on the line so that they can see how well or how poorly they are producing as compared to a predetermined standard. This can serve to keep incentive up and work interest. It is also possible by means of suitably designed operational amplifiers to convert the pieces per hour into a dollars and cents cost, and read this particular value off on a suitable electrical meter with an altered unit measuring scale.

From the foregoing description of the overall article/time recording system, it will be appreciated therefor that the system is capable of keeping an accurate count of every employee punching into or out of work on a standard commercial time clock. It keeps an accurate count of the total number of employees on any assembly line, packing station, or any other type of operation utilized by the manufacturing firm. It makes available at any time, the total amount of accumulated worker time by those employees on any of the above operations. It provides a direct read-out accurate to any desired decimal amount, of the total accumulation of work time, on any operation by any number of employees at any desired time of read-out. In other words, the read-out is accumulated constantly and is instantaneously available. The system also records all of the items or parts produced, in any unit amount desired, that are or are not a direct result of the manufacturing operations. In any case where the items produced are a direct result of those operations, a cost control figure of units per worked hour is readily available by simply dividing the total number of units produced by the total number of worked hours required to produce those units. This figure is available either manually through division on the part of an operator assigned to the read-out information station, or it may be obtained electrically through direct acting computation devices. Here again, this figure is available on an instantaneous basis at any desired read-out time. The system can completely record all of the items passing out of the manufacturing areas over a conveyor system into a storage area. This can be done item by item again reading out in any unit desired. Another important feature (to be discussed more fully hereinafter) is that the articles placed on the conveyor, can be placed at random without any special markings necessary on the items, and the system can be so set as to not only count these items at random by units, but also sort them by type of item into any combination desired. The system will provide information as to how many people are being recorded for paid purposes at any instant since they are being recorded by the time clock. It will also tell one the total time being paid for at any instant to any decimal figure desired. It will record the total number of people and the amount of time being worked by these same people on any particular operation. This provides an instantaneous check of the time and people being paid for, for comparison to particular job standards for the jobs at which these people are working, and the time spent on the job. The system will aid in obtaining good standard costs using standard units per worked-unit of time and will also help in controlling production and evaluating the advantages or disadvantages of different production techniques on an "on the spot" instantaneous basis. It provides a record of all of the units of a particular article produced, and supplies the manufacturer with a triple check on this figure which is quite important in obtaining accurate inventory records.

Packing Area Counting and Read-out Device

At the end of each assembly line, as the completed article leaves the assembly line, it is generally packed into a container usually in some predetermined quantity such as one per box, one half dozen per box, one dozen per box, etc. When each container is closed, a special piece of "control tape" is placed on it in a predetermined location on the container. In order for the packer to obtain this "control tape" a conventional, commercially available electro-mechanical dispensing and counting apparatus is employed. This apparatus may be any one of a number of commercially available dispensing and preset count, counting mechanisms wherein the preset count is one. Actuation of the tape dispenser to issue one piece of 'control tape' causes the counter registering device to register one count in the unit counters $26_1$, $26_2$, $26_3$, etc located in the read-out information room. If desired, the count may also be recorded on a suitable indicating dial located in the packing area.

In addition to registering a count for each piece of 'control tape' issued, the dispenser activates a visual or audible signal which is locked "on", and is not turned "off" until the packer places the container in a specified area (such as a loading platform or on the loading section of a conveyor), and then presses a second control switch which will deenergize the visual or audible alarm. This second control switch preferably also is used to control the dispenser which is designed so that it is locked out and cannot dispense another piece of control tape until such time that the second control switch is actuated thereby indicating that the packer has placed the container in the specified area. This is a safety feature which diminishes the possibility of a packer placing two pieces of control tape on one package, and thereby botching up the count of the number of articles coming off the assembly line. It also makes it mandatory for the packer to place each container in the specified area. The count provided by the packing area counting and read-out means then gives a running and instantaneous count of the number of articles produced by each assembly line. This figure coupled with the total worked time on each line as indicated by the meter 25 for the particular line, will then supply the instantaneous pieces per unit per person-hour rate which can be compared against a standard. The desirability of having this figure on an instantaneous demand basis has been pointed out above.

Conveyor Loading and Counting Mechanism

As illustrated in FIG. 1 of the drawings, the next article count to be obtained following the packing area count, is that derived in the conveyor loading area 14 by the loading area count registering device 17. This count is obtained automatically by an operator loading the conveyor 15. A standard roller or belt type electro-mechanical powered conveyor is used in conjunction with a gravity operated loading area portion employing a special circuit such as that shown in FIG. 2 of the drawings. Referring to FIG. 2 each container of completed articles is loaded by placing the container on an inclined, unpowered, roller (loading) section of the conveyor shown generally at 71. Thereafter, the container will roll down until it encounters the activation arm or trigger arm 72 of a micro switch 73 for deriving a count of the articles loaded on the conveyor. The trigger arm 72 is placed in the center of the conveyor and is pivotally mounted with a spring return so that it always returns to a normal inactive position where it will be contacted by the next container passing over the loading section of the conveyor. The unpowered, gravity operated loading portion of the conveyor is placed immediately adjacent to a powered section 74 in a manner such that a container traveling down the gravity operated portion will slide onto and engage at least a part of the powered portion of the conveyor while simultaneously depressing the trigger arm 72.

The powered conveyor portion shown generally at 74 is designed so that it runs only when the switch arm 72 is depressed. Therefore, as a container moves past and depresses the switch arm 72, the powered section of the conveyor is activated so as to withdraw the container off of the count registering trigger 72, and onto the power driven portion of the conveyor a sufficient distance to assure return of the trigger 72 to its normally inactive position thereby recording one count while simultaneously loading the power driven portion of the conveyor with one completed article. Upon this occurrence, the powered portion of the conveyor will again stop due to the trigger 72 no longer being depressed. It will be seen therefore that as each container is placed on the loading portion 71 of the conveyor, the powered section 74 inches forward only enough to accept each container that passes the trigger arm 72. Concurrently with this action, activation of the switch 73 by the trigger arm 72 operates to record one count in the loading area counter 18 located in the read-out station 11. If desired, a similar counter may be activated in the loading area to indicate to the loading operator that the container has been properly counted and recorded.

Another safety factor which is built into the conveyor loading and counting system is to protect against two or more containers being counted as one by the trigger arm 72. This is possible because if, for example, two containers are placed on the loading portion 71 of the conveyor back to back, trigger arm 72 will be depressed and power section 74 activated. As the first container moves into the powered section, the second container (being back to back against the first) does not allow the trigger arm 72 to return to its normally inactive position, which is required in order to record a count for the second container. Consequently, the loading area counter would record only one unit count instead of two. To prevent this occurrence, a count assuring, cylinder actuated, stop shown at 75 and having a stopping arm 76 is provided. The cylinder actuated stop 75, 76 is activated by the switch 73 so that the stopping arm 76 is raised to prevent containers moving down the loading section 71 in back to back fashion. Therefore, during the time that a container is on the trigger arm 72, no other container may enter the area (at a predetermine distance) in front of the arm 72 without being stopped by the extended stop arm 76 of cylinder 75. Since in most manufacturing firms, the length of the containers will vary widely, a number of such stops are required at various positions in the unpowered section 71, the activation of which is determined by a selector switch to be described more fully hereinafter.

Referring again to FIG. 1 of the drawings, it will be seen that the loading area counter 18 located in the read-out information station 11 has on its face a plurality of dials indicated as number 1 through 5 together with a total dial. Each of these dials 1 through 5 comprises a separate meter which may be selectively activated by a selector switch arm, the setting of which is determined by the setting of an identical counter located in the loading area 14. This setting adjustment is made by the loading operator in accordance with the type of article being loaded. Hence, it will be appreciated that each meter 1 through 5 will represent the total number of a given type of article or container being loaded. The fact that five meters are used is purely for explanatory purposes since there may be any number of meters to correspond to the number of assembly lines being serviced. With this arrangement, if the loading operator decides to load containers of item number 3 for example, he sets the selector switch to the unit meter representing item number 3. Thereafter, each time that the trigger arm 72 and switch 73 are actuated in the loading area, one unit count will be added to the count accumulated on the unit meter 3. Also, one count is added to the total units out of the loading area meter shown in the lower portion of the counter 18. It will be seen therefore that as each different item is loaded onto the conveyor, the selector switch is changed to record the total number of each different type of article or container being loaded, and that the lower totaling meter will provide a total count of all of the articles or containers being processed through the loading area.

It should also be noted at this point that the selector switch arm for the loading area counters also activates the previously mentioned differently positioned stopping arms 76 for accommodating different length containers of completed articles. It will be seen therefore that as each different item is loaded onto the loading portion 71 of the conveyor, the selector switch is actuated by the loader-operator so as to count and record separately the total number of this particular type of container being loaded, and that the selector switch also selects which particular stopping arm 76 will be actuated so as to accommodate the particular size container for the type of article being loaded.

Unloading Area Counting and Read-out

Another control feature made available by the conveyor loading and counting system of the invention is the provision of an unloading area counting and read-out means for deriving a count of the completed articles being transported to an unloading area from the manufacturing facility. As is best seen in FIG. 1 of the drawings, this unloading area is located at the discharge-unloading end of conveyor 15 and comprises an unloading area count registering device 19. The count registering device 19 may comprise any form of electric switch for producing one electric signal pulse for each container or article coming into the unloading area. However, preferably the device 19 comprises a counter similar to the loading area counter 18 described previously for accommodating different types of articles being processed through the unloading area. It is also preferable that the device 19 comprise an automatically triggered counter mechanism such as the trigger actuated switching arrangement 72, 73 shown in FIG. 2. This arrangement may be mounted on an unpowered, gravity operated discharge-unloading portion of the conveyor mechanism for automatically recording one count for each container supplied to the unloading portion of the conveyor. If a multi-type counter 21 is used as the unloading area counter in the read-out information station 11, a similar multi-type counter will be employed as the unloading area count registering device 19. With such an arrangement, all that the unloader-operator has to do is to change the position of the selector switch to identify the particular type of article being unloaded and the count for such article will be registered on his own and on the unloading area counter 21 in the read-out information station 11. Concurrently, a totalized count of all containers passing through the unloading area will be registered on the total count appearing in the lower portion of the counter 21.

FIG. 3 of the drawings illustrates in sectional view the discharge-unloading portion of the conveyor 15 wherein the count registering trigger arm is shown at 81 for actuating a micro switch 82 that records the count of a container passing through the unpowered, gravity operated roller section 83 supplied from the powered section 74 of the conveyor. Thereafter, a container passing through the unloading-discharge portion of the conveyor rolls onto a section 84 which may be either gravity operated or a powered section. This section includes at least one over-delivery sensing and inactivating control means for sensing a build up of unloaded containers being delivered to the discharge unloading portion above a predetermined number, and for inactivating the power driven portion 74 of the conveyor mechanism in response to this build-up. This over-delivery sensing and inactivating control is comprised by a series of limit switches 85 and 86 which control the power operated section 74 of the conveyor. This protection feature is provided in order to enable an operator-unloader to remove the containers from the section 84 without fear of the containers being put on by the loading area operator so fast that they pile up in the unloading area. The limit switches 85 and 86 are spaced farther apart in distance than the longest container to be processed. Therefore, if the containers start to pile up at the unloading-discharge end of the conveyor, then either one, or both of the limit switches 85 and 86 will be depressed so as to deenergize the powered section 74. Whether one or two of the limit switches 85 and 86 is determined by the degree of build-up that will be tolerated before the limiting action is introduced. Upon the powered section 74 being thus deenergized by either or both of the limit switches 85 and 86, the stop 76 at the loading end will automatically be raised by cylinder 75 so that no further containers may be loaded onto the conveyor until the limit switches 85 and 86 are again cleared.

As stated previously, in the read-out information station 11 there is located all of the counters and meters employed in the article/time recording system. This enables one man in the read-out information station to keep track of all of the information necessary to obtain the desired cost accounting and inventory control information required in controlling the operations of the manufacturing facility. By reading the loading area counters 18 and the unloading area counter 21 it is possible for him to keep track of all of the containers moving from one area of the plant to another. It also provides a check against the counts that are obtained from the unit line read-outs 26 on a continuously updated substantially instantaneous basis. Under normal operation, at the beginning of any one work day or other work period of time, all the unit meters are set to zero and all the containers made during that period are placed in the storage area at the end of the period. Under these conditions, the sum total on each unit line read-out 26 should equal the total for each item respectively of the unit meters on the loading area and unloading area counters 18 and 21, respectively. Also the total of all the unit line read out counters 26 should equal the total counts shown on both the loading area counter 18 and unloading area counter 21. In order to facilitate placing all the containers in the storage area at the end of a work period, a manual on-off switch is provided at the unloading station for placing the power driven portion of the conveyor mechanism in a continuous run mode whereby all of the containers previously loaded onto the power driven portion on a one-count-at-a-time basis, can be transported to and unloaded at the storage area. Simultaneously with the actuation of the continuous run, manually operated, on-off switch, the count assuring stop means at the loading stations is actuated to prevent any further loading of the power driven portion of the conveyor during the clearing operation thereby preventing any foul-up in the count obtained at the read-out information station.

From the foregoing description, it will be appreciated that the present invention provides a new and improved conveyor loading and counting system for manufacuting plants which facilitates the maintenance of a central, continuously up-dated, running account of the number of articles produced and transported out of the plant to a warehouse area, etc whereby an accurate and readily obtained up-to-date figure for the numbers of articles produced per worked hour and/or the number of articles produced each day, is instantaneously available for accounting and inventory control purposes at any time during the work day or at the end of the day.

Having described an embodiment of a new and improved conveyor loading and counting system constructed in accordance with the invention, it is believed obvious that other modifications and variations of the invention are possible in the light of the above teachings. It is therefore to be understood that changes may be made in the particular embodiment of the invention described which are within the full intended scope of the invention as defined by the appended claims.

What is claimed is:

1. A conveyor loading and counting assembly for an automatic conveyor mechanism which includes a power driven portion that normally in its inactive condition engages an article to be conveyed subsequent to the article being loaded upon the conveyor mechanism, count registering and energizing trigger means for registering a unit count in a counter for each completed article loaded upon the conveyor mechanism and for actuating the power driven portion of the conveyor to cause the conveyor to convey the article thus counted to another location, and a gravity operated portion that feeds the power driven portion and upon which the articles to be conveyed are initially placed, the count registering and energizing trigger means being supported on the gravity operated portion in a position spaced from the power driven portion designed to assure simultaneous engagement of the gravity operated portion and actuation of the count registering and energizing trigger means whereby the power driven portion will be enabled upon each occurrence of an article being placed on the conveyor mechanism to withdrawn the article off the count registering and energizing trigger means and onto the power driven portion a sufficient distance to assure return of the trigger means to its normally inactive position while simultaneously loading the power driven portion of the conveyor with one article.

2. A conveyor loading and counting assembly according to claim 1 further including manually operated, continuous-run, on-off switch means for placing the power operated portion of the conveyor mechanism in a continuous run mode for clearing the conveyor of all containers previously loaded thereon at the end of a work day.

3. A conveyor loading and counting assembly according to claim 1 further including a plurality of differently located count assuring stop means for assuring an accurate count of articles loaded on the conveyor and for accommodating articles of different types, and types of article selector means for controlling which particular type count assuring stop means is rendered active for use in controlling the supply of articles to the power driven portion of the conveyor mechanism.

4. A conveyor loading and counting assembly according to claim 3 further including manually operated, continuous-run, on-off switch means for placing the power operated portion of the conveyor mechanism in a continuous run mode for clearing the conveyor of all containers previously loaded thereon at the end of a work day, said count assuring stop means being actuated simultaneously with the operation of said manually operated, continuous run switch means.

5. A conveyor loading and counting assembly according to claim 3 wherein the conveyor mechanism further includes at its discharge-unloading end a discharge gravity operated portion to which the power driven portion delivers articles stored thereon for unloading, and said gravity operated portion includes at least one over delivery sensing and inactivating control means for sensing a build-up of unloaded articles being delivered to the discharge gravity operated portion above a predetermined number and for inactivating the power driven portion of the conveyor mechanism in response thereto.

6. A conveyor loading and counting assembly according to claim 5 further including unloading area counting and read-out means for delivering a count of the articles transported by the conveyor mechanism to the discharge-unloading end thereof, and unloading area count registering means located in the unloading area and coupled to and controlling the unloading area counting and read-out means.

7. A conveyor loading and counting assembly according to claim 6 wherein the unloading area count registering means comprises unloading article sensing trigger means mounted on the discharge-unloading gravity operated portion of the conveyor mechanism for registering one unit count for each article transported over such discharge-unloading portion into the unloading area.

8. A conveyor loading and counting assembly according to claim 7 wherein said unloading area counting and read-out means includes a plurality of different characteristic article counters for deriving a count of each different type of article coming into the unloading area, and type of article selector means comprising a part of the unloading area count registering means for selectively activating a desired one of the plurality of different characteristic article counters in accordance with the type of article coming into the unloading area.

9. A conveyor loading and counting assembly according to claim 8 further including manually operable control means for inactivating the power driven portion of the conveyor mechanism and simultaneously activating the count assuring stop means at the option of an operator-unloader working at the discharge-unloading end of the conveyor mechanism.

10. A conveyor loading and counting assembly according to claim 9 further including manually operated, continuous-run, on-off switch means for placing the power operated portion of the conveyor mechanism in a continuous run mode for clearing the conveyor of all containers previously loaded thereon at the end of a work day, said count assuring stop means being actuated simultaneously with the operation of said manually operated, continuous run switch means.

11. A conveyor loading and counting assembly according to claim 5 further including manually operable control means for inactivating the power driven portion of the conveyor and simultaneously activating the count assuring stop means.

12. A conveyor loading and counting assembly according to claim 1 wherein the conveyor mechanism further includes at its discharge-unloading end a discharge gravity operated portion to which the power driven portion delivers articles stored thereon for unloading, and said gravity operated portion includes at least one over delivery sensing and inactivating control means for sensing a build-up of unloaded articles being delivered to the discharge gravity operated portion above a predetermined number and for inactivating the power driven portion of the conveyor mechanism in response thereto.

13. A conveyor loading and counting assembly according to claim 12 further including manually operable control means for inactivating the power driven portion of the conveyor mechanism at the option of an operator-unloader working at the discharge-unloading end of the conveyor mechamism.

14. A conveyor loading and counting assembly according to claim 12 further including unloading area counting and read-out means for deriving a count of the articles transported by the conveyor mechamism to the discharge-unloading end thereof, and unloading area count registering means located in the loading area and coupled to and controlling the unloading area counting and read-out means.

15. A conveyor loading and counting assembly according to claim 14 wherein the unloading area count registering means comprises unloading article sensing trigger means mounted on the discharge-unloading portion of the conveyor mechanism for registering one unit count for each article transported over such discharge-unloading portion into the loading area.

16. A conveyor loading and counting assembly according to claim 1 further including unloading area counting and read-out means for deriving a count of the articles transported by the conveyor mechanism to the discharge-unloading end thereof, and unloading area count registering means located in the unloading area and coupled to and controlling the unloading area counting and read-out means.

* * * * *